United States Patent Office 2,778,746
Patented Jan. 22, 1957

2,778,746

PROCESS OF COLORING OF GLASS FABRICS

Robert Steinman, Los Angeles, and William F. Eberz, Capistrano Beach, Calif., assignors to Alexander H. Kerr and Company, Incorporated, Los Angeles, Calif., a corporation of Nevada No Drawing. Application October 26, 1955,
Serial No. 543,012

14 Claims. (Cl. 117—76)

The present invention is concerned with an improved process for coloring of glass fabrics, and forms a continuation-in-part of our copending application, Serial No. 149,216, entitled "Coloring of Glass Fabrics," filed March 11, 1950, now abandoned.

This application is also a continuation of our copending application, Serial No. 336,633, entitled "Coloring of Glass Fabrics," filed February 12, 1953, now abandoned.

Many attempts have been made to introduce color onto glass fabrics for decorative purposes. To our knowledge, however, these attempts have not been completely successful because the bonding agent used to apply the coloring matter to the glass fabric often decreases the flexibility, the softness or "hand" characteristic of the uncolored glass fabric. Instead of producing a fabric which would be suitable for purposes such as the manufacture of drapes, glass fabrics treated by the processes of the past have resulted in a fabric which has the stiff and brittle feel of canvas. In addition, colors applied by previous methods are often not resistant to washing and will evidence substantial color fading when laundered.

In previous attempts to color glass fabric, various procedures have been followed. In this connection, the glass fabric has been pre-conditioned so as to make it porous for receipt of coloring solutions and, after dipping in coloring solutions, has been coated with silicone resin such as ethyl phenyl polysiloxane. In addition, glass fabric has been coated with hydrolyzable organo-silicane and dried, whereupon the fabric was dipped in water solutions of organic dyes. Furthermore, it has been known to disperse pigment in silicone resin and to introduce the dispersion into porous fibers of glass fabric.

However, these previous coloring attempts, while occasionally satisfactorily coloring the fabric, have not provided a strong fabric and were quite expensive.

The present invention provides a method for incorporating color onto a glass fabric while at the same time retaining the softness and flexibility of the glass strands. Fabrics treated according to our invention are particularly useful in the manufacture of drapes and similar decorative articles, as the fabrics hang in soft folds and do not have the stiff, rigid pleats characteristic of glass fabrics treated by other processes.

An object of the present invention is to provide an improved process for coloring glass fabrics in which the resulting glass fabric is flexible and has a particularly desirable "hand."

Another object of the invention is to provide a method for incorporating color onto glass fabrics in such a manner that the color is substantially resistant to removal by washing.

We have now found that a substantially improved colored glass fabric is produced if a clean glass fabric is treated with a coloring agent containing a water soluble or dispersible hydrolysis product of an alkyl-alkoxysilane dissolved therein in combination with a non-cationic wetting agent and a water dispersible coloring agent. For purposes of this application, we refer to the silane compound as being in the A stage of cure when it is in a water soluble or water dispersible condition. This is to be distinguished from the B and C stages of cure, the B stage being a stage in which the silane compound is soluble in alcohol and the C stage being a stage in which the silane compound is soluble in aromatic or chlorinated hydrocarbons.

After treatment with the hydrolysis product, the fabric may then be coated with a protective coating, such as polysubstituted siloxane, acrylic or related coatings. We have discovered that not only may the coloring agent be applied before application of the protective coating but it may be applied prior to or simultaneously with the protective coating. This discovery makes possible the manufacture of a soft and flexible colored fabric in a single pass of the fabric through the solution and the concept of such simultaneous coloring and improvement of the physical properties of the fabric has not been known prior to our invention in the treatment of glass fabric.

In order to prepare the glass fabric for receipt of the coloring agent, it is usually necessary to treat the uncolored fabric to remove any extraneous coating material. In the manufacture of glass fabrics extremely small glass filaments are assembled to form a sliver which is wound into strands or yarns. As the filaments are formed into slivers, it is customary to coat the filaments with an organic sizing material to hold the filaments together during subsequent processing. The strands are then woven, knitted, or otherwise formed into the glass fabric. In preparing a sized fabric of this type for coloring, it is important that substantially all of the organic size be removed so that the glass is rendered more receptive to the subsequently applied silane polymers.

To insure adequate removal of the organic size material, we prefer to use the process described in the application of Clarence Klug, Serial No. 72,124, filed January 22, 1949, now United States Patent No. 2,633,428 and assigned to the same assignee as the present invention. Briefly, the process described in that application consists in continuously moving the sized glass fabric through a heated zone in which an excess of oxygen is present. In passing through the zone, the fabric is heated to a temperature sufficient to ignite the organic size, causing it to burn as a surface flame in a band transverse to the direction of movement of the fabric. As described in the aforementioned application, the speed of the fabric in passing through the zone is adjusted so that the surface flame band appears in a substantially fixed position in the zone.

After the removal of the sizing material, the fabrics may then be treated with a coating material containing a poly-substituted siloxane capable of being reacted with the fabric to provide a water repellent coating. Numerous types of siloxane compounds can be employed for this coating step, but we prefer to use methylsilanetriol or ethyl silanetriol, these compounds being in the A stage of cure. Under elevated temperature condition, these compounds polymerize.

The coating solution may be used in the form of an aqueous emulsion containing stabilizing agents such as quaternary ammonium compounds. The simplest manner of coating the bare glass fabric consists in immersing the fabric in an emulsion containing about 2 to 10 volume percent of polydimethyl or polydiethyl siloxane or silicone and ethyl silicic acid and then heating the coated fabric at an elevated temperature to provide a water repellent coating on the fabric. The temperatures employed in reacting the coating with the fabric will vary from about 450 to 700° F., with longer times being used at low temperatures, and vice versa. During this heating step, the siloxane polymer, at least partially depolymerized by the heating, becomes securely bonded to the glass fabric as a dry film substantially hydrophobic in character. The effectiveness of the original coating can be readily ascertained by testing its water repellency. If water still wets the fabrics after the film is formed, the fabric may be recoated with additional quantities of the emulsion and reheated.

After such coating, the coloring agent may be applied, the coloring agent including as a primary ingredient a water soluble hydrolysis product of an alkylalkoxysilane dissolved therein, a small amount of a noncationic wetting agent, and a water dispersible coloring material. Our studies have indicated that alkyl-substituted polyalkoxysilanes up to compounds having alkyl groups up to 7 carbon atoms in length are suitable for fixing color onto the siliconed glass fabric. Of course, the various alkyl derivatives vary in their effectiveness, and the preferred compounds are those in which the alkyl group is relatively short. Specifically, we prefer to use materials such as ethyltriethoxysilane, diethyldiethoxysilane, dimethyldiethoxysilane, amyltriethoxysilane, or mixtures of these compounds as the resinous ingredient in the coloring agent. Apparently, these compounds hydrolyze in aqueous solution to produce water soluble derivatives of silicic acid which have the ability to bond themselves to the siliconed surface on the glass fabric. Other silane derivatives which are capable of yielding water soluble or colloidally dispersible silicic acid compounds can also be employed for the purposes of this invention. The silane derivatives are added to produce a concentration of about 0.5 to 5.0 percent by volume in the coloring solution.

The water soluble stage or A stage of the silane compound is only temporary and the compound progressively advances to B stage. It is necessary that the compound be in the water soluble or A stage or in colloidally dispersed B stage when applied to the glass fabric to provide the features of this invention.

The coloring agent employed may be any of the conventional coloring agents either in the form of water soluble dyes or suspended pigments. By the term "water dispersible coloring agent," we mean to include both types of coloring materials.

Surprisingly, the hydrophobic siliconed surface will readily accept a coloring agent even though the latter is dispersed in an aqueous medium. It appears that the hydrophobic film may be partially penetrated by the colored resinous solution through the action of the wetting agent, so that the resin is affixed to a large number of small areas of the glass which appear as a continuous colored area to the naked eye, thus producing the colored effect desired. However, under microscopic examination it appears that the minute colored areas are actually discontinuous thereby permitting free movement of the threads of the fabric over one another and avoiding the binding and stiffness which is characteristic of a continuous film of a siloxane resin.

The ability of the coloring agent to attach itself to the hydrophobic surface of the siliconed fabric may be due primarily to the presence of the non-cationic, i. e., anionic or preferably nonionic, wetting agent added. Apparently, the wetting agent penetrates the hydrophobic surface of the fabric and permits the resinous constituents to become bonded to the siliconed surface. The use of cationic wetting agents should be avoided because they tend to cause precipitation of water dispersible dyes and pigments.

The best results are achieved in our process if the wetting agent is nonionic in character, such as those produced by copolymerization of ethylene oxide or propylene oxide with various hydrophobic substances. Such wetting agents are available commercially under the trade name "Igepal CA." Other wetting agents suitable for this process include the alkyl aryl polyether alcohols (e. g., Triton X–100), long chain fatty acid partial esters of hexitol anhydrides ("Spans"), polyoxyalkylene derivatives of hexitol anhydrides partial long chain fatty acid esters ("Tweens"), mixtures of mono- and di-substituted amides ("Ethomides") and polyoxyethylene substituted fatty acid mixtures ("Ethofats"). These nonionic wetting agents provide solutions of a high degree of stability with regard to types of materials that can be added to their solutions without causing coagulation or instability. In addition, the nonionic wetting agents tend to decompose thermally at the temperatures employed in the final heat treating stage so that maximum washing fastness is obtained.

Anionic wetting agents are also useful, in the processes mentioned, although the resulting fabrics are not as wash fast when using anionic compounds such as sodium salts of sulphonated alkyl aryl compounds, sulphonated lauryl alcohol, and the like.

The amount of non-cationic agent added to the coloring matter will normally be very small, on the order of 0.01 percent to 1 percent by weight of the solution, and usually from about 0.1 to 0.5 percent. The coloring agent can be applied to the siliconed fabric in any of a variety of manners. Preferably, the glass cloth is immersed in an aqueous solution of the coloring agent and then passed through tight rolls to drive the solution into the fabric and to equalize the distribution of the coloring agent through the fabric.

After the coloring agent has been applied, the glass fabric is dried and is heat treated to fix the coating onto the glass fabric. This step normally involves treatment for a few minutes at temperatures in the range from 450° to 600° F., depending upon the type of silicic acid derivative used, and the type of coloring agent used. Higher temperatures than those indicated should be avoided as they tend to destroy the color and the siloxane compound, while lower temperatures result in less fixation and hence lower washability. Lower temperatures will suffice, however, where longer times are available in which to cure the compound.

Instead of applying the coating material first, the coloring agent may be applied to the cleaned glass fibers. After applying the coloring agent, the colored fabric is heated at a temperature below which (a) the wetting agent, (b) the color or (c) the silicic acid derivative may be damaged until the coloring agent is dried. The coating material is then applied to the fabric and the fabric dried.

Of particular advantage in the manufacture of glass fabric is our discovery that the cleaned fabric may be coated and colored with an aqueous dispersible dye in a single step operation. As a result, various drying steps may be eliminated and the fabric may be very simply coated.

We are aware that aqueous systems of compatible polysiloxane compounds have been employed in the treatment of glass fabric. However, the utilization of hydrolysis products of alkyl alkoxysilane in the A stage of cure, poly-substituted siloxane, water dispersible color, and an emulsifying agent to assure even distribution of color is believed to be wholly new.

In our process, we mix hydrolysis product of an alkyl alkoxysilane in the A stage of cure with a water dispersible poly-substituted siloxane, a color which is water dispersible, and a wetting agent. Cleaned glass fabric is run through the mixture, distributed through the fabric and dried on the fabric. Thus, in a single pass, the fabric is coated and a water dispersible dye is distributed throughout the fabric.

It has been before pointed out that a coating other than poly-substituted siloxane may be employed and, in this connection, we have found that acrylic resins provide certain improved physical properties to the fabric. In this connection, polymerized methyl and ethyl acrylates are highly satisfactory and provide fabrics having excellent grease resistant properties.

The following examples will serve to illustrate the process of the present invention in a more complete manner.

*Example I*

In preparing the fabrics for coating, the sized glass fabric as received from a mill was first desized by passing it through an electric furnace six feet in length in the presence of air at 1200° F. at a speed of about 10 feet per minute.

The desized or bare glass fabric was then immersed in an aqueous emulsion containing about 5 percent by volume of a liquid poly-methyl silicone oil which was stabilized by the addition of 0.05 percent cetyl di-methyl benzyl ammonium chloride. The resulting coated glass fabric was then passed through tight rubber rollers, dried, and heat set by passage through an electric furnace at 600° F. at a speed of 10 feet per minute.

This fabric was then treated as follows:

*Example IA*

A coloring solution was prepared by mixing 350 ml. water, 1165 ml. of a solution obtained by vigorously stirring one volume of ethyl triethoxysilane with 10 volumes of water at 30° C. until dissolved (a period of about six hours), 1165 ml. of a 4 percent solution of a water dispersible copper phthalocyanine green pigment, and 7.5 grams of a nonionic wetting agent of the polyoxyalkylene type.

A one yard length of 50 inch wide siliconed cloth was dipped in the above solution, passed through tight rubber rollers, dried, and set with heat at 450° F. The product exhibited a uniformly pleasing green color with a soft "hand" and drapability. It showed only a very slight loss of color when a sample was wash tested by rotating it for five minutes in a vessel containing a 1 percent aqueous soap solution and ⅓ filled with glass balls.

*Example IB*

The coloring solution was prepared by mixing 12.0 liters of water, 3.0 liters of hydrolyzed ethyltriethoxysilane prepared as in Example IA, 9.0 g. of a water dispersible copper phthalocyanine blue pigment, 52.2 g. of a 35 percent commercial paste of carbon black and water, and 22.5 g. of a nonionic wetting agent.

A five yard length of 50 inch wide desized glass cloth was passed through the above solution and then pressed by tight rubber rollers. The fabric was then dried in a gas furnace at 450° F. It was then passed through a six-foot electric furnace at 575° F. at a speed of 8 feet per minute. The product had a good, uniform steel gray color and evidenced only a very slight loss of color in the wash test described in Example IA.

*Example IC*

The color solution was prepared by mixing 17.5 g. of water, 5.0 g. of hydrolyzed ethyl triethoxysilane prepared as in the preceding examples, 2.5 g. Algol yellow G. C. paste and 0.05 g. of a nonionic wetting agent. A small piece of siliconed glass fabric was dipped in the solution and after removing the excess solution, the sample was heat treated for one minute at 550° F. to 560° F. After the aforementioned washing test, a good yellow color and soft "hand" were observed.

*Example II*

The cleaned glass fabric of Example I was dipped in the coloring solution described in Example IA and passed between rubber rolls. The fabric was heated for fifteen minutes at a temperature of about 360° F. which resulted in drying of the coloring solution onto the fabric.

Next, the colored fabric was passed through the methyl silicone emulsion of Example I. To dry and set the silicone, the fabric was passed through an electric furnace at 600° F. at a speed of 10 feet per minute.

The resulting fabric had good feel and handleability and the color was fast to the fabric.

*Example III*

A combination coating and coloring solution was prepared by mixing poly-methyl silicone oil emulsion in an amount sufficient to give a 5 percent emulsion with a coloring solution comprising 3500 ml. of water, 1165 ml. of a solution obtained by vigorously stirring one volume of ethyltriethoxysilane with 10 volumes of water at 30° C. until dissolved (a period of about 6 hours), 1165 ml. of a 4 percent solution of a water dispersible copper phthalcyanine green pigment, and 7.5 grams of a polyoxyalkylene type wetting agent (non-ionic).

A five yard length of 50 inch wide desized glass cloth was passed through the above solution and then processed in the manner described in Example IB. The product had a uniform green color with a soft "hand" and good drapability. Washing demonstrated that the color was fast.

It will be evident that various modifications can be made to the described process without departing from the scope of the present invention.

We claim:

1. A process for coloring a bare glass fabric which comprises coating the bare glass fabric with a thin film of a poly-substituted siloxane and a dilute aqueous solution containing a water soluble hydrolysis product of an alkyl alkoxysilane containing not more than 7 carbon atoms in the alkyl group dissolved therein, the silane compound being in the A stage of cure, said solution also having dispersed therein a small amount of a water dispersible coloring agent and a small amount of a non-cationic wetting agent, and heat treating the glass fabric to fix a coating on the glass fabric.

2. A process for coloring a bare glass fabric which comprises coating the bare glass fabric with a mixture comprising a poly-substituted siloxane and a dilute aqueous solution containing a water soluble hydrolysis product of an alkyl alkoxysilane containing not more than 7 carbon atoms in the alkyl group dissolved therein, the silane compound being in the A stage of cure, and a small amount of a non-cationic wetting agent, said solution also having dispersed therein a small amount of a water dispersible coloring agent, and heat treating the glass fabric to fix a coating on the glass fabric.

3. A process for coloring a bare glass fabric which comprises coating the bare glass fabric with a dilute aqueous solution containing a water soluble hydrolysis product of an alkyl alkoxysilane containing not more than 7 carbon atoms in the alkyl group dissolved therein, the silane compound being in the A stage of cure, and a small amount of a non-cationic wetting agent, said solution also having dispersed therein a small amount of a water dispersible coloring agent, and then coating the fabric with a solution of a poly-substituted siloxane, and heat treating the glass fabric to fix the coatings on the glass fabric.

4. A process for coloring a bare glass fabric which comprises coating the bare glass fabric with a dilute aqueous solution containing a water soluble hydrolysis product of an alkyl alkoxysilane containing not more than 7 carbon atoms in the alkyl group dissolved therein and a small amount of a non-cationic wetting agent, said solution also having dispersed therein a small amount of a water dispersible coloring agent, heating and drying the coating on the glass fabric, coating the glass fabric with a solution of a poly-substituted siloxane, and heat treating the glass fabric to fix the coatings on the glass fabric.

5. A process for coloring a bare glass fabric which comprises coating the bare glass fabric with a thin film of a poly-substituted siloxane, heating and drying said film on said fabric at an elevated temperature to provide a water repellent coating on said fabric, coating the resulting fabric over the first coating with a dilute aqueous solution containing a water soluble hydrolysis product of an alkyl alkoxysilane containing not more than 7 carbon atoms in the alkyl group dissolved therein and a small amount of a non-cationic wetting agent, said solution also having dispersed therein a small amount of a water dispersible coloring agent, and heat treating the thus coated glass fabric to fix the coating on the glass fabric.

6. A process for coloring a bare glass fabric which comprises coating the bare glass fabric with a thin film of a poly-substituted siloxane, heating and drying said film on said fabric at an elevated temperature to provide a water repellent coating on said fabric, coating the resulting fabric over the first coating with an aqueous solution containing from about 0.5 to 5.0 percent of a water soluble hydrolysis product of an alkyl-alkoxysilane containing not more than 7 carbon atoms in the alkyl group dissolved therein and a small amount of a non-cationic wetting agent, said solution also having dispersed therein a small amount of a water dispersible coloring agent, and heat treating the thus coated glass fabric to fix the coating on the glass fabric.

7. A process for coloring a bare glass fabric which comprises coating the bare glass fabric with a thin film of poly-substituted siloxane, heating and drying said film on said fabric at an elevated temperature to provide a water repellent coating on said fabric, coating the resulting fabric over the first coating with a dilute aqueous solution containing a water soluble hydrolysis product of an alkyl poly-ethoxysilane containing not more than 7 carbon atoms in the alkyl group dissolved therein and a small amount of a non-cationic wetting agent, said solution also having dispersed therein a small amount of a water dispersible coloring agent, and heat treating the thus coated glass fabric to fix the coating on the glass fabric.

8. A process for coloring a bare glass fabric which comprises coating the bare glass fabric with a thin film of a poly-substituted siloxane, heating and drying said film on said fabric at an elevated temperature to provide a water repellent coating on said fabric, coating the resulting fabric over the first coating with a dilute aqueous solution containing a water soluble hydrolysis product of an alkyl polyethoxysilane in which the alkyl constituent contains not more than 7 carbon atoms dissolved therein and a small amount of a noncationic wetting agent, said solution also having dispersed therein a small amount of a water dispersible coloring agent, and heat treating the thus coated glass fabric to fix the coating on the glass fabric.

9. A process for coloring a bare glass fabric which comprises coating the bare glass fabric with a thin film of a poly-substituted siloxane, heating and drying said film on said fabric at an elevated temperature to produce a siliconed glass fabric, coating said siliconed glass fabric with an aqueous solution containing from about 0.5 to 5.0 percent of hydrolyzed ethyl triethoxysilane and a small amount of a non-cationic wetting agent, said solution also having dispersed therein a small amount of a water dispersible coloring agent, and heat treating the thus coated glass fabric to fix the coating on the glass fabric.

10. In a process for coloring a glass fabric having a dry coating of a siloxane resin thereon, the steps of coating said fabric with a dilute aqueous solution containing a water soluble hydrolysis product of an alkyl-alkoxysilane containing not more than 7 carbon atoms in the alkyl group dissolved therein and a small amount of a non-cationic wetting agent, said solution also having dispersed therein a small amount of a water dispersible coloring agent, and heat treating the thus coated fabric to anchor the coating onto said dry coating.

11. In a process for coloring a glass fabric having a dry coating of a siloxane resin thereon, the steps of coating said fabric with an aqueous solution containing from about 0.5 to 5.0 percent of a water soluble hydrolysis product of an alkyl-alkoxysilane containing not more than 7 carbon atoms in the alkyl group dissolved therein and a small amount of a non-cationic wetting agent, said solution also having dispersed therein a small amount of a water dispersible coloring agent, and heat treating the thus coated fabric to anchor the coating onto said dry coating.

12. In a process for coloring a a glass fabric having a dry coating of a siloxane resin thereon, the steps of coating said fabric with a dilute aqueous solution containing a water soluble hydrolysis product of an alkyl-alkoxysilane containing not more than 7 carbon atoms in the alkyl group dissolved therein and from about 0.1 to 0.5 percent of a non-cationic wetting agent, said solution also having dispersed therein a small amount of a water dispersible coloring agent, and heat treating the thus coated glass fabric to anchor the coating onto said dry coating.

13. In a process for coloring a glass fabric having a dry coating of a siloxane resin thereon, the steps of coating said fabric with a dilute aqueous solution containing a water soluble hydrolysis product of an alkyl-alkoxysilane containing not more than 7 carbon atoms in the alkyl group dissolved therein and a small amount of a nonionic wetting agent, said solution also having dispersed therein a small amount of a water dispersible coloring agent, and heating the thus coated glass fabric to anchor the coating onto said dry coating.

14. In a process for coloring a glass fabric having a dry coating of a siloxane resin thereon, the steps of coating said fabric with an aqueous solution containing from about 0.5 to 5.0 percent of a hydrolysis product of ethyl triethoxysilane dissolved therein and a small amount of a nonionic wetting agent, said solution also having dispersed therein a small amount of a water dispersible coloring agent, and heat treating the thus coated glass fabric to anchor the coating onto said dry coating.

References Cited in the file of this patent
UNITED STATES PATENTS

| | | |
|---|---|---|
| 2,390,370 | Hyde | Dec. 4, 1945 |
| 2,582,919 | Biefeld | Jan. 15, 1952 |
| 2,649,396 | Witt et al. | Aug. 18, 1953 |